United States Patent
Gross

[11] 3,936,185
[45] Feb. 3, 1976

[54] APPARATUS AND METHOD FOR HOLDING A FILM ON A CARRIER AND DETECTING CORRECT PLACEMENT

[75] Inventor: Frank C. Gross, Wilbraham, Mass.

[73] Assignee: Scott Paper Company, Philadelphia, Pa.

[22] Filed: Apr. 8, 1974

[21] Appl. No.: 459,196

Related U.S. Application Data

[63] Continuation-in-part of Ser. No. 349,452, April 9, 1973.

[52] U.S. Cl. .................................................. 355/73
[51] Int. Cl.² ......................................... G03B 27/60
[58] Field of Search .............. 355/72, 73, 74, 93, 94

[56] References Cited
UNITED STATES PATENTS
2,170,622  8/1939  Sussin .................................. 355/93

Primary Examiner—John M. Horan
Attorney, Agent, or Firm—R. Duke Vickrey; William J. Foley

[57] ABSTRACT

Disclosed is a method and apparatus for holding and detecting correct placement of a photosensitive film on a carrier in a photographic reproduction apparatus for imaging the film. The carrier has an alignment surface against which the film is firmly held when imaged. Vacuum means are provided which are operably connected to the alignment surface for holding the film securely to the alignment surface. Air passageway means operably connected to the vacuum means are provided in the alignment surface, the air passageway means being of a size and in a position to form a closed vacuum system which permits a high vacuum level only when the film is correctly placed on the carrier. Vacuum level detecting means operably connected to the vacuum means are provided for detecting the level of the vacuum, and therefore, correct placement of the film on the carrier. The carrier is preferably provided with reciprocating means for moving the carrier to and from a load position outside of the enclosure of the photographic reproduction apparatus and an imaging position within the enclosure. The vacuum detecting means is preferably operably connected to control means which prevent the carrier from moving into an imaging position unless the film is correctly placed upon the carrier with the photosensitive surface facing the imaging means within the apparatus, and the control means is also preferably operably connected to the reciprocating means to return the carrier to the load position if the film moves from its securely held position against the alignment surface.

9 Claims, 4 Drawing Figures

APPARATUS AND METHOD FOR HOLDING A FILM ON A CARRIER AND DETECTING CORRECT PLACEMENT

RELATED APPLICATIONS

This patent application is a Continuation-in-Part of U.S. patent application Ser. No. 349,452, dated Apr. 9, 1973 entitled ELECTROPHOTOGRAPHIC METHOD AND APPARATUS.

BACKGROUND OF THE INVENTION

1. Field of the Invention

The present invention relates generally to systems for photographically reproducing data on photosensitive film, and more particularly, to an apparatus and method for holding the film on and determining correct placement of the film on the film carrier during imaging of the film.

2. Description of the Prior Art

Stimulated by the cost incurred in storing the ever-increasing volume of documentary material which is presently being generated, considerable effort has been expended in the design and development of various electrophotographic and other data storage and retrieval systems. Particular emphasis has been placed on the design of microphotographic systems which may be used to decrease the physical bulk of such stored materials without sacrificing file retrieval and/or copy reproduction capabilities. One type of commonly employed apparatus for recording data on a film for data storage is the indirect type of reproduction apparatus wherein a document is placed face down on a transparent platen and a light image is reflected from the document and directed by mirrors through a lens system and onto the film. In this type of system, the film, which is preferably a microfiche, must be securely held on the imaging axis at the proper focal length away from the lens system. Correct placement of the film is assured through use of a carrier having an alignment surface against which the film is firmly held when imaged. Since the carrier is usually positioned inside of the enclosure of the photographic reproduction apparatus, it is not conveniently available for placement of a film, or microfiche, upon the carrier. This inconvenience is eliminated by reciprocating the carrier from the enclosure to a load position and then back into the imaging position within the apparatus enclosure after placement of a film upon the carrier.

It is quite important for the operator of the reproduction apparatus to be able to quickly place the film upon the carrier and be assured that it is properly positioned on the carrier. This problem is further complicated by the fact that the film has a photosensitive layer only on one surface and that surface usually must be positioned on the carrier facing the directed light image. This necessity is particularly true, where the film is developed within the reproduction apparatus, as is preferably the case with electrophotographic reproduction apparatus. Of course, the film must be in the proper position on the carrier in order for the light image to be directed to the correct location on the film, a problem which is particularly critical when the film is a microfiche having a number of small frames to be individually imaged and developed.

In addition to the problem of properly positioning the film on the carrier so that the light image is projected to the correct location on the film and the photosensitive layer of the film is facing the light image, it is important that the film be securely held against the alignment surface to assure that the film is the proper distance from the lens. A number of clamping arrangements are available to securely hold the film against the alignment surface, but they not only have the disadvantage of increased complication in the carrier design and inconvenience to the operator, but assure only that the border portions of the film are held securely to the alignment surface, since the clamping arrangements can only be located in the border regions without interfering with imaging of the film.

Another system which can be used to securely hold the film against an alignment surface is use of a vacuum applied through the alignment surface to securely hold the entire film against the alignment surface. While use of the vacuum system solves some of the problems described, one problem which can occur with its use is dislocation of the film on the carrier while the carrier is in the imaging position. Such a dislocation can occur through temporary loss or reduction of the vacuum, or from some other interfering force which moves the film on the carrier. It is quite important to the operator to be assured that the film is in the proper position on the carrier while he is imaging the film. Additionally, it is desirable to return the carrier to the load position outside of the apparatus enclosure in the event the film is dislocated from its correct placement in order to prevent the film from falling into the interior of the apparatus where extrication can be quite difficult.

It is, therefore, an object of the invention to provide an apparatus and method for securely holding a film against an alignment surface on a carrier upon which the film is imaged in a photographic reproduction apparatus. It is a further object of the invention to provide a method and apparatus for detecting whether the film is properly positioned at the correct location on the carrier and whether the photosensitive layer of the film is facing the imaging means. And, it is a further object of the invention to provide an apparatus and method for preventing the carrier from entering or remaining within the apparatus enclosure if the film is incorrectly placed on the carrier or the film becomes dislocated on the carrier through loss of vacuum or other disturbing force.

SUMMARY OF THE INVENTION

These and other objects are accomplished by the apparatus and method of invention. The apparatus of the invention is combination means for holding a photosensitive film on a film carrier in a photographic reproduction apparatus and for detecting correct placement of the film on the carrier. The apparatus not only detects whether the film is placed at the correct location on the carrier, but in a preferred form of the invention, detects whether the photosensitive layer of the film is facing the light image within the reproduction apparatus. The carrier has an alignment surface against which the film is firmly held when imaged, and vacuum means are operably connected to the alignment surface for holding the film securely against the alignment surface. Air-passageway means are provided in the alignment surface and are operably connected to the vacuum means for forming a closed vacuum system only when the film is correctly placed on the carrier. Vacuum level detecting means are connected to the vacuum means for detecting the level of the vacuum within the system. If the film is correctly placed on the carrier, the vacuum level detecting means detects a high level of vacuum, and if the film is incorrectly placed on the carrier, the vacuum level detecting means detects a low level of vacuum, occurring as a result of vacuum leakage through the air-passageway means not covered by the film. In the preferred embodiment of the apparatus, reciprocating means are provided for moving the carrier to and from a load position outside of the reproduction apparatus enclosure and an imaging position within the enclosure, and the vacuum level detecting means is operably connected to control means for preventing the carrier from entering the enclosure unless the film is properly placed on the carrier and for returning the carrier to the load position outside of the enclosure if the film becomes dislocated on the carrier.

The apparatus includes means for determining whether the film is positioned on the carrier with the photosensitive layer facing the light image. Those means consist of a pair of film-positioning pins on the carrier designed for insertion into positioning holes on the film to correctly position the film on the carrier. The positioning holes on the film are asymmetrically located so that the film is placed against the alignment surface in one position when the photosensitive layer is facing the light image, and the film is placed against the alignment surface in another position offset from the first position if the photosensitive layer is facing the alignment surface rather than the light image. The air-passageway means in the alignment surface is so sized and positioned to be completely covered by the film when it is positioned in the correct location on the alignment surface and partially uncovered by the film when the film is positioned in the incorrect location on the carrier.

DESCRIPTION OF THE PREFERRED EMBODIMENT OF THE INVENTION

Figure 1:
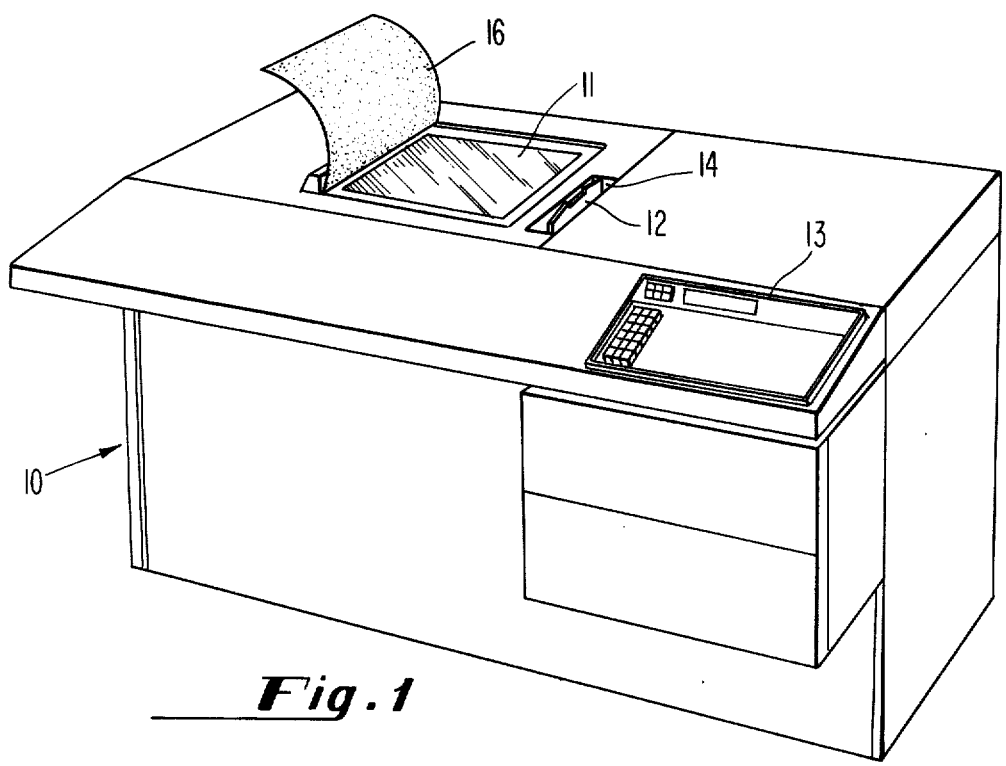
FIG. 1 is a perspective view of a photographic reproduction apparatus in which the present invention is advantageously employed.

A photographic reproduction apparatus in which the present invention is employed is illustrated in FIG. 1 and is self-contained within a housing of generally rectangular configuration, indicated generally at 10. The top of the housing 10 is generally flat in construction and is designed to incorporate an operator's console 13, a microfiche access slot 14, and a copyboard 11. The operator's console 13 contains all necessary controls for operating the apparatus to enable the system operator to control the reproduction sequence.

A carriage assembly having a microfiche carrier 12 is disposed within the enclosure 10 such that the carrier 12 may be transported upwardly through slot 14 to a load position, illustrated in FIG. 1. In the load position, a microfiche may be easily placed upon the carrier 12 for movement into the enclosure 10. After placement of a microfiche on the carrier 12, the carrier 12 may be transported back to the imaging position, illustrated in FIG. 2.

Figure 2:
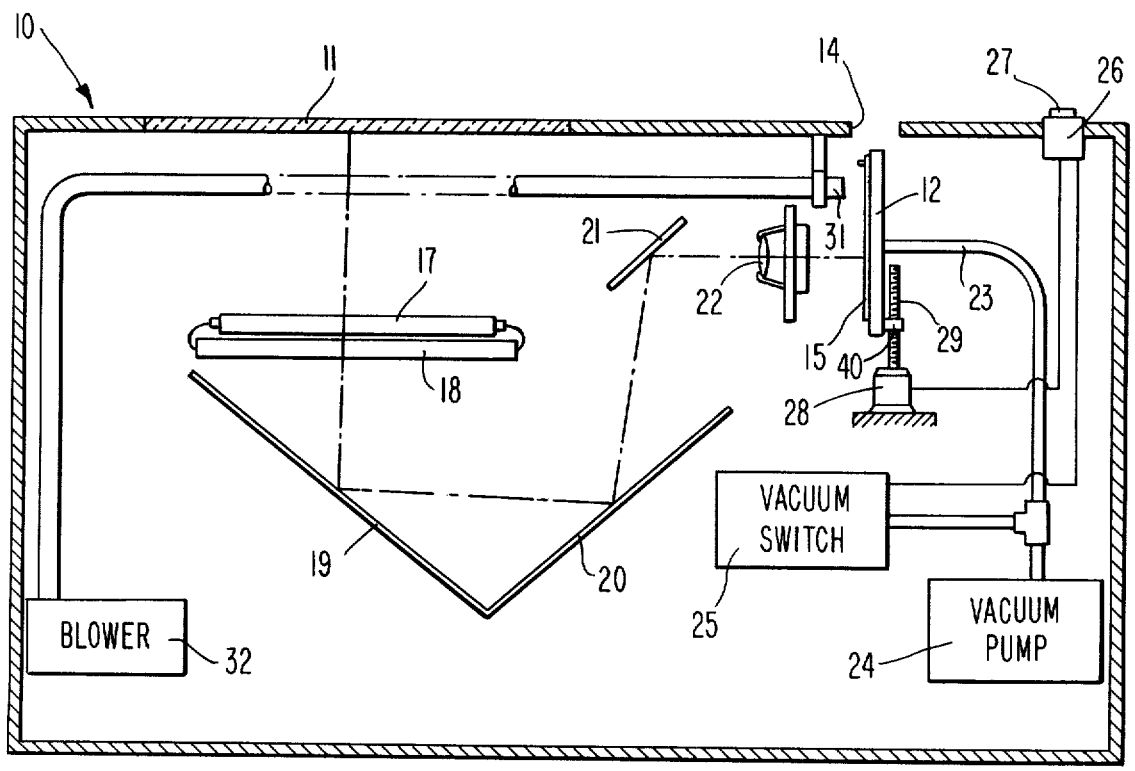
FIG. 2 is a diagrammatic sectional view showing the optical assembly of the apparatus of FIG. 1 and the apparatus of the invention.

The photographic reproduction apparatus is diagrammatically illustrated in FIG. 2, where a document is placed upon transparent copyboard 11, and a light from lamp 17 and reflector 18 is reflected off of the document and directed by mirrors 19, 20, and 21 through lens 22 and onto the desired location on microfiche 15 placed upon carrier 12. The means for reciprocating carrier 12 to and from the load position and the imaging position is provided by reversible electric motor 28 and screw 29 passing through threaded lug 40 on carrier 12.

Figure 3:
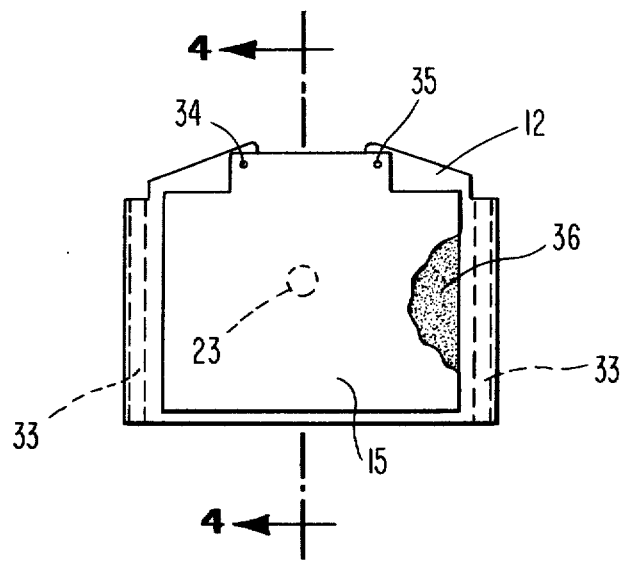
FIG. 3 is a front elevational view of the carrier of the invention showing a microfiche inserted thereon.
Figure 4:
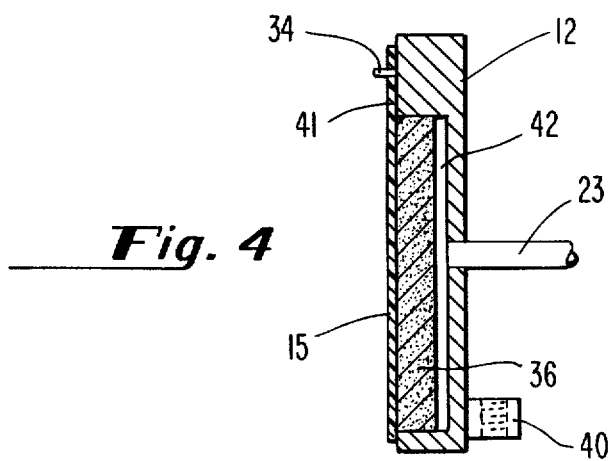
FIG. 4 is a cross-sectional view of the carriage of FIG. 3 taken along line 4—4.

Carrier 12, illustrated in FIGS. 3 and 4, includes a flat, alignment surface facing the imaging means. The alignment surface has an air-impervious border region 41, provided by such material as plastic, and an inner, air-pervious surface 36, which can be provided by such material as porous ceramic material. On both sides of the carrier 12 are cylindrical sleeves 33 in which guide rods (not shown) are placed to guide the carrier to and from the load position and the imaging position.

Vacuum means, illustrated as vacuum pump 24 in FIG. 2, communicates with the carrier 12 through conduit 23. Conduit 23 enters the back of the carrier 12 and communicates with the air-pervious surface 36 through cavity 42. The air-impervious border region 41 surrounding the air-pervious material 36 cooperates with conduit 23 to provide a closed vacuum system about the air-pervious material 36, except for the exposed portion of the air-pervious material 36 forming the alignment surface of the carrier 12.

The carrier 12 includes film-positioning pins 34 and 35 for insertion in corresponding positioning holes in the microfiche 15. The positioning holes in the microfiche 15 are asymmetrical with respect to the vertical center line of the film so that placement of the film on the carrier 12 with the correct side of the film against the alignment surface will centrally position the film 15 on the carrier 12, but will place the film off-center if the incorrect surface of the film 15 is placed against the alignment surface. The area of the alignment surface which is provided by the air-pervious material 36 is smaller in size than the area of the film 15 and so positioned that it is entirely covered by the film 15 when the film 15 is placed on the carrier 12 with the proper side facing the alignment surface and the positioning holes over the film-position pins 34 and 35. However, if the film is reversed in its placement on the carrier 12, a portion of the air-pervious material 36 is uncovered by the film, and a closed vacuum system is not formed.

Vacuum detecting means, illustrated as vacuum switch 25, which detects whether the vacuum level within the conduit 23 is above or below a predetermined level, is connected to the conduit 23. Conventional electrical circuitry connects the vacuum switch to control means 26 for operation of the carrier-reciprocation motor 28. The electrical means and control means 26 can be provided by any conventional means, such as relays, which will perform the process function described subsequently.

The apparatus in its preferred form also includes a blower 32, which constantly blows air through conduit 31 against the film 15 held on the carrier 12. The air blown through conduit 31 is helpful in holding the film 15 to the carrier 12 upon release of the vacuum system, whether the release is deliberate for removal of a film 15 or inadvertent while the film is within the enclosure 10. This function is particularly useful to prevent dropping the film 15 into the enclosure 10 where it is difficult to extricate.

The operation of the invention will now be described. An operator places a microfiche 15 onto the carrier 12 in the load position (FIG. 1) by insertion of the film-positioning pins 34 and 35 through the positioning holes on the film. He then presses control button 27 which activates the vacuum pump 24, applying a vacuum to the film through the air-pervious surface 36. The film is securely held against the alignment surface of the carrier 12, and the vacuum, operating as a closed system, reaches a predetermined level which activates vacuum switch 25, permitting actuation of motor 28 and movement of carrier 12 into the copy position (FIG. 2) within the enclosure. If the film is placed on the carrier 12 with the photosensitive layer incorrectly facing the alignment surface rather than the imaging means, the film 15 does not completely cover the air-pervious material 36, and the vacuum level never reaches the predetermined level. Therefore, the vacuum switch 25 is not actuated to permit the control means 26 to energize motor 28, and the carrier 12 remains in the load position outside of the enclosure. At the same time, an electrical signal from the vacuum switch 25 can illuminate a warning lamp which informs the operator that the film 15 is not correctly placed on the carrier 12.

If the film 15 is correctly placed on the carrier 12, and the carrier 12 has been moved into the imaging position within the enclosure 10, the operator may then proceed with placing documents upon the copyboard 11, covering the documents with copyboard cover 16 and imaging the film. In the event the film 15 becomes displaced from its correct position on the carrier 12 for any reason, such as temporary loss of the vacuum which might result in the film 15 moving slightly away from the alignment surface, the vacuum switch 25 will detect the loss of vacuum level within the conduit 23, and will transmit an electrical signal to the control means 26, which will in turn energize motor 28 to move the carrier 12 back to the load position outside of the enclosure 10. Thus, the operator does not continue imaging the film when it is not correctly placed on the carrier or at the correct focal distance from the lens 22. The film is transported to the load position as quickly as possible to avoid dropping the film into the interior of the enclosure.

The air supplied by blower 32 through conduit 31 pushes the film 15 against the carrier 12 with sufficient force to hold the film to the carrier while the carrier and film are being returned to the load position. The air from the blower 32 is also useful in holding the film 15 to the carrier 12 after deliberate release of the vacuum means when the carrier 12 is in the load position and the operator desires to remove the film 15 from the carrier 12.

While the apparatus and method of the invention have been described in their preferred embodiments, a number of variations can be employed within the scope of the invention. For example, the air-pervious material 36 can be provided in some arrangements by a simple open conduit rather than a porous material, although the porous material is very advantageous in forming a flat surface against which the film can be held for proper alignment. Also, forms of positioning means other than pins 34 and 35 and holes in the film can be used, examples being notches in the film and protuberances on the carrier, or vice versa.

What is claimed is:

1. In a photographic reproduction apparatus for directing a light image along an imaging axis to a photosensitive film positioned on a film carrier within the apparatus, combination means for holding the film on the carrier and detecting correct placement of the film on the carrier, the combination means comprising:
   an alignment surface on the carrier against which the film is firmly held when imaged;
   vacuum means operably connected to the alignment surface for holding the film securely to the alignment surface;
   air-passageway means in the alignment surface and operably connected to the vacuum means for forming a closed vacuum system, and permitting a high vacuum level, only when the film is held securely against the alignment surface and in the correct position with respect to the imaging axis; and
   vacuum level detecting means operably connected to the vacuum means for detecting the level of the vacuum, and therefore, correct placement of the film on the carrier.

2. A photographic reproduction apparatus for imaging a film having a photosensitive layer on one surface and first positioning means asymmetrically located on the film, the apparatus comprising:
   A. an enclosure within which the film is imaged;
   B. imaging means within the enclosure for exposing the film to a light image;
   C. a carrier for holding the film in a predetermined position with respect to the imaging means while the film is being imaged, the carrier comprising,
      i. second positioning means for engaging the first positioning means on the film to position the film in a correct location on the carrier if the film is placed with the photosensitive layer towards the imaging means and to position the film in an incorrect location on the carrier if the film is placed with the photosensitive layer away from the imaging means, and
      ii. a flat alignment surface against which the film is firmly held, the alignment surface having an air-impervious border region and an air-pervious inner region, the inner region occupying an area which is completely covered by the film when the film is positioned in the correct location on the carrier and is partially uncovered by the film when the film is positioned in the incorrect location on the carrier;
   D. reciprocating means for moving the carrier to and from a load position outside of the enclosure and an imaging position within the enclosure;
   E. vacuum means operably connected to the air-pervious inner region for holding the film securely against the alignment surface, the vacuum means forming a sealed vacuum system when the film is held securely against the alignment surface in the correct location; and
   F. vacuum detecting means operably connected to the vacuum means for detecting the vacuum level and thereby detecting when the film is held securely against the alignment surface in the correct location.

3. Apparatus according to claim 2, including control means operably connected to the reciprocating means and the vacuum detecting means for moving the carrier to the load position if a drop in vacuum level is detected when the carrier is in the imaging position.

4. Apparatus according the claim 3, wherein the control means prevents movement of the carrier from the load position to the imaging position unless the film is placed at the correct location on the alignment surface.

5. Apparatus according to claim 4, including means to constantly blow air against the film on the carrier.

6. In a photographic reproduction apparatus for directing a light image along an imaging axis to a photosensitive film positioned on a film carrier within the apparatus, a method of holding the film on the carrier and detecting correct placement of the film on the carrier comprising the steps of:

applying a vacuum to the film through air-pervious passageway means in an alignment surface on the carrier to hold the film firmly against the alignment surface, the air-pervious passageway means being of a size and location to form a closed vacuum system, and a high vacuum level, only when the film is held firmly against the alignment surface and in the correct position with respect to the imaging axis; and detecting the presence or absence of the high vacuum level, thereby detecting correct placement of the film on the carrier.

7. Apparatus according to claim 1, wherein the air-passageway means occupies an area in the alignment surface which is completely covered by the film held against the alignment surface, and thereby forms a closed vacuum system, only when the film is correctly positioned with respect to the imaging axis.

8. Apparatus according to claim 7, wherein the air-passageway means is provided by a porous material having a flat surface which forms part of the alignment surface.

9. Apparatus according to claim 1, further including means operably associated with the air-passageway means for detecting which surface of the film is placed towards the light image when the film is on the carrier.

* * * * *